May 20, 1958 O. G. FRETZ 2,835,870

TREMOLO-FREQUENCY MODULATOR

Filed Sept. 18, 1956

INVENTOR.

ORA G. FRETZ

BY *Harry M. Saragovitz*

Attorney

United States Patent Office 2,835,870
Patented May 20, 1958

2,835,870

TREMOLO-FREQUENCY MODULATOR

Ora G. Fretz, Fort Worth, Tex.

Application September 18, 1956, Serial No. 610,694
4 Claims. (Cl. 332—52)
(Granted under Title 35, U. S. Code (1952), sec. 266)

The invention described herein may be manufactured and used by or for the Government for governmental purposes, without the payment of any royalty thereon.

The present invention relates to the art of modulating an electronic signal, more particularly, to an improved electronic circuit adapted to be inserted in a signal circuit or incorporated in an amplifier for modulating said signal.

Still more particularly, the present invention relates to a modulating device which may be inserted in an electronic circuit between a musical instrument and an amplifier, or incorporated in an amplifier unit for a musical instrument to enable the production of a vibrato or tremolo effect.

It is an object of the present invention to provide an improved modulator capable of operating at very low frequency, of the order of two to twenty cycles per second and the production of an undistorted modulated output.

Another object of the invention is to provide a modulator operable at low frequencies for producing an output free of an amplified modulating signal.

Yet another object of the invention is to provide a modulator which is comparatively simple in structure, compact and uncomplicated by complex and critical balancing means.

Another object of the invention is to provide a modulator capable of being inserted in an electronic circuit between a musical instrument and an amplifier and capable of being incorporated in an amplifier for a musical instrument to permit the introduction of a vibrato or tremolo effect in the output of said amplifier.

Another object is to provide a modulator capable of modulation in excess of one hundred percent to produce an echo effect in the output of the amplifier.

Another object is to provide a modulating device capable of insertion or incorporation in an electronic circuit and of being actuated by a square wave generator to produce a periodic gating effect in said circuit.

Other objects of the invention will be apparent from the following description and the disclosure of the drawings.

Two circuits embodying the principles of the invention are shown in the accompanying drawings in which.

Figure 1:
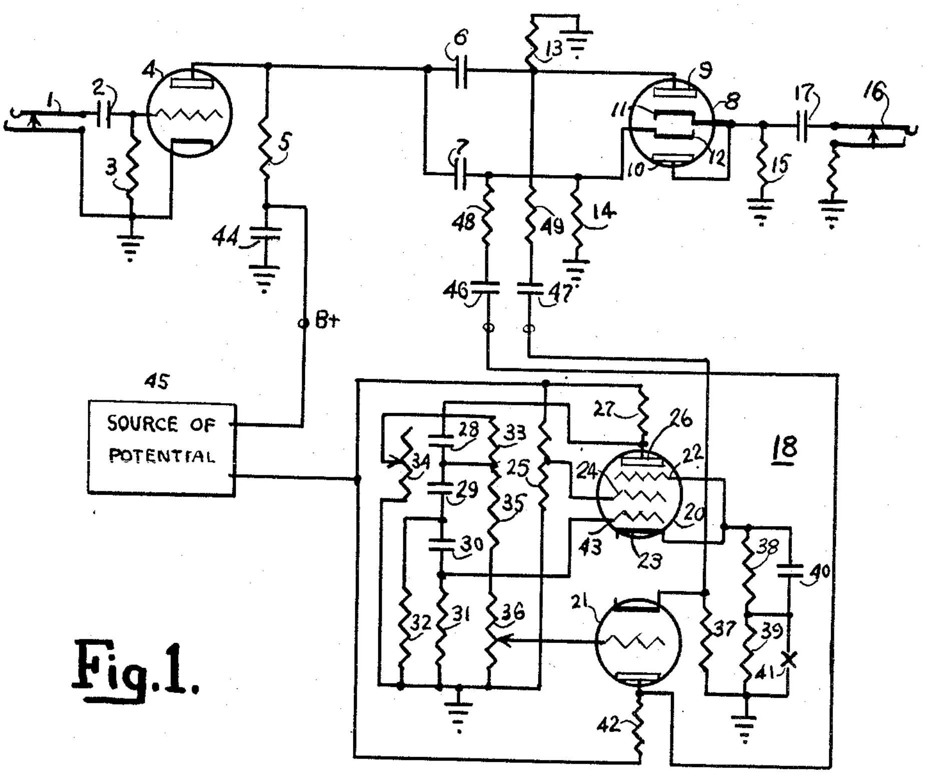
Figure 1 is a schematic view of a unitary modulator device which may be inserted in a circuit between a musical instrument and an amplifier to produce a tremolo effect.

As disclosed in Fig. 1 of the drawings, the modulator is designed and constructed as a unitary component for insertion between a musical instrument and an amplifier. If desired, the modulator may be constructed as a part of an amplifier.

It includes an input jack 1, into which may be plugged an audio frequency output of a musical instrument. The jack 1 is coupled through a coupling capacitor 2 and resistor 3 to the input of the triode 4. The output of said triode 4 is coupled by resistor 5 and capacitor 44 to ground and by resistor 5 to a source 45 of B+ potential. The triode 4 serves as an amplifier to increase the strength of the audio signal to compensate for losses incurred in the modulating circuit.

The output from the triode 4 is coupled through a pair of capacitors 6 and 7 to a parallel circuit in each leg of which is connected a vacuum tube type diode. Separate diodes may be substituted for the double diode tube shown if desired. The capacitor 6 is connected to the anode 9 of one diode and the capacitor 7 is connected to the cathode 12 of the other diode. The anode 9 and cathode 12 are further respectively connected to ground through equal resistors 13 and 14. The cathode 11 and the anode 10 are connected together to ground through a single resistor 15 and to an output jack 16 through a capacitor 17. As thus connected, one diode renders one circuit conductive in one direction and the other diode renders the other circuit conductive in the direction opposite to that of the first circuit. Together, the two parallel circuits operate as a symmetrically conductive path.

The vacuum tube type diodes may, if desired, be replaced by diodes of the semi-conductor type, as for example those made of germanium or silicon or the like, by appropriate alteration of the values of the components of the circuits. Further, by use of printed circuits and transistors, the modulator may be made extremely compact, light in weight and adapted to be powered by batteries.

As further disclosed in Fig. 1, the modulator includes an oscillator means, generally shown at 18, which may be of any type desired, but the preferred type, as illustrated, is a Wien-bridge oscillator, otherwise known as a phase-shift oscillator, connected through a phase-splitter to the parallel circuit.

The oscillator tube 20 is provided, with a suppressor grid 22, connected to the cathode 23 and a screen grid 24 connected to a potential divider 25. The potential divider 25 is connected between a source of potential 45 and ground to provide the proper bias potential for the screen grid 24. The cathode 23 is further connected to ground through a pair of series connected resistors 38 and 39. The resistor 38 is shunted by capacitor 40 and the resistor 39 is shunted by a switch means 41, such as for example, a toggle switch. The switch 41 serves as a means for altering the cathode bias of the tube 20 to control its conductivity and the generation of alternating voltages by the oscillator. The anode 26 is connected through resistor 27 to the source of potential 45 and to a phase-shifter bridge circuit, through a coupling capacitor 28.

The bridge circuit comprises a capacitor 29 and resistors 32, 33 and 34. The coupling capacitor 28 is connected to one terminal of the capacitor 29 and to one terminal of each of the resistors 33 and 35. The other terminal of the capacitor 29 is connected through resistor 32 to ground and to one terminal of the capacitor 30. The other terminal of the capacitor 30 is connected to ground through resistor 31 and to the control grid 43 of the tube 20. The other terminal of the resistor 33 is connected to ground through potentiometer 34. The potentiometer 34 serves as a means for modifying the frequency characteristics of the bridge for varying the operating frequency of the oscillator tube 20.

The output from said oscillator tube 20 is connected through the resistor 35, and potentiometer 36 to ground and to the grid of the triode tube 21. The triode 21 functions as a phase-splitter and for this purpose has a loaded anode and cathode circuit to provide a dual output of equal amplitude and of opposite phase. The cathode of tube 21 is connected through resistor 37 to ground and through capacitor 47 and resistor 49 to one leg of the parallel circuit, intermediate the capacitor 6 and anode 9. The anode of tube 21 is connected through resistor 42 to the source of potential 45 and through capacitor 46 and resistor 48 to the other leg of the parallel circuit, intermediate the capacitor 7 and the cathode 12. The potentiometer 36 serves as a means for varying the amplitude of the output voltages of the tube 21. The tube 21 also serves as an amplifier of the output of the oscillator tube 20.

Potential source 45 is illustrated by a block and may be of any type desired, which provides the proper voltages to the various circuits above described. For example, it may be a system of batteries or a power pack having a transformer, rectifier and filter circuits well known in the art.

In operation of the invention, shown in Fig. 1, an audio-frequency signal is fed into the modulator through the jack 1. It is amplified in the triode 4 and applied to the parallel circuits through the coupling capacitors 6 and 7. One leg of said parallel circuit conducts during one half cycle of the audio-signal and the other leg of the parallel circuit conducts during the other half cycle of the audio signal, and the output is connected through a common capacitor 17 and jack 16, which may be connected to a further amplifier and speaker not shown. In the absence of any modulating signal from the oscillator means 18, the parallel circuit conducts the audio-signal unmodulated and substantially unattenuated from jack 1 to jack 16.

When the switch means 41 is actuated to provide the proper bias on the cathode of tube 20, to initiate the operation of the oscillator, a sine wave signal is impressed upon the two legs of the parallel circlit, through the phase-splitter tube 21, capacitors 46 and 47 and resistors 48 and 49. As to said sine wave signals, the diodes in the parallel circuit during one half cycle of said sine wave, form a conductive by-pass shunting resistors 13 and 14, and during the other half cycle, the diodes are non-conductive to the modulating sine wave signal voltages. During the latter half cycle of the sine wave signal, the impressed voltage across the resistors 13 and 14 reduces the conductivity of the diodes of the audio-frequency signal. The degree of reduction of conductivity during the blocking half of the sine wave signal depends on the amplitude of the sine wave signal. The alternate half cycles of said sine wave signal thus operates to modulate the audio-signal at the tremolo frequency.

The amplitude of the modulating sine wave voltages may be adjusted through manipulation of the potentiometer 36. If desired, an echo effect may be produced by adjusting the potentiometer 36 to increase the amplitude of modulating sine wave voltage to a value necessary to completely block the diodes during one half cycle of the sine wave, or during a substantial portion of said half cycle. The recurrent blocking of the audio signal produces the simulated echo.

The frequency of the oscillator and the tremolo effect may be controlled and varied at will through the manipulation of the potentiometer 34.

Although the modulator of Fig. 1 is designed to operate in the low frequency range of two to twenty cycles per second, it may, if desired, be designed to operate in other frequency ranges by the appropriate alteration of the circuit parameters.

Figure 2:
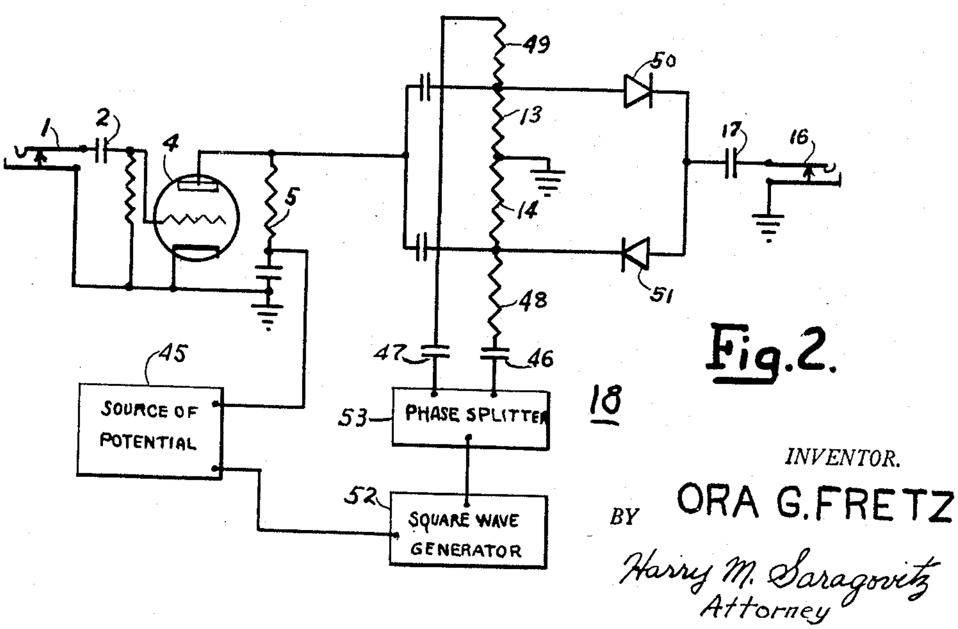
Figure 2 is a schematic view of the device modified in certain respects and adapted for use in an electronic circuit for producing a gating effect.

Fig. 2 shows an embodiment of the invention designed and constructed to be inserted in a circuit wherein it is desired to modulate the signal between predetermined limits or for producing a recurrent gating effect. As in the Fig. 1, the signal to be modulated is fed into the jack 1 and capacitor 2 to the input of the amplifier tube 4. From the amplifier, the amplified signal to be modulated at amplified strength is fed through the capacitors 6 and 7 to the parallel circuits.

As shown in Fig. 2 the legs of the parallel circuits each have diodes of the semi-conductor type as for example made of germanium or silicon or the like. The diodes 50 and 51 are arranged so as to render one leg of the parallel circuit conductive exclusively in one direction, and the other leg of the parallel circuit exclusively conductive in the opposite direction. Together the legs of the parallel circuit form a symmetrically conductive circuit between the jack 1 and the jack 16. As in Fig. 1 the embodiment shown in Fig. 2 includes coupling capacitors 6, 7 and 17 in the modulator circuit and coupling capacitors 46, 47 and resistors 13, 14, 48 and 49 connected in the same manner as shown in Fig. 1. The embodiment of Fig. 2 further differs from that shown in Fig. 1 by the substitution of a square wave generator and phase-splitter for the phase-shift oscillator and phase-splitter.

A square-wave generator 52 is connected to the source of potential 45 and provides a square-wave signal. The square wave generator is connected to the phase-splitter 53 to which is fed the square-wave voltage. In the phase-splitter, the square-wave voltage is split into two square wave voltages of equal amplitude, and of opposite phase and amplified. The phase-splitter is connected through coupling capacitors 46 and 47 and resistors 48 and 49 to the legs of the parallel circuit intermediate the coupling capacitors 6 and 7 and the diodes 50 and 51.

In the mode of operation, the embodiment of Fig. 2 is similar to that shown in Fig. 1, except it differs in respect to the character of the modulating signal fed to the modulating circuit. Whereas in Fig. 1, the modulating signal is a sine wave in the embodiment of Fig. 2 the modulating signal is a square wave.

In the absence of any modulating signal, the signal impressed upon the parallel circuit is transmitted to jack 16 substantially unattenuated. As in the embodiment of Fig. 1, the amplifier 4 in Fig. 2 serves to compensate for the losses incurred in the modulator circuit.

When the square wave modulating signal is impressed upon the modulator circuit, the frequency signal is attenuated periodically and varies in amplitude between limits fixed by the amplitude of the modulating signal and parameters of the modulating circuit. The amplitude for the modulating signal may be made adequate to completely block the diodes if desired, to thus produce a recurrent blocking effect. An example of use of such a circuit is in a grid circuit of a cathode ray tube to blank the return sweep of the electron beam.

The two embodiments of the invention offer several advantages not realized in practice in the prior art devices of similar nature. The present modulator operates particularly well in the low frequency range of two to twenty cycles per second. It does not amplify the modulating signals and does not require low pass filtering or complicated or critical balancing to suppress the modulating voltages. The present modulator is fundamentally balanced and is easily adapted to a push pull stage using additional diodes driven by a single end oscillator.

Having disclosed the invention and the manner of making and best mode of utilizing the same, what is claimed as the invention is covered by the following claims.

I claim:

1. A tremolo frequency modulator unit for insertion between a musical instrument and an amplifier comprising, a pair of circuits connected in parallel having coupling capacitors at one end and means at the other end to render said circuits conductive in one direction opposite to each other and capable of varying the conductivity thereof, resistance means of equal value connecting each said circuits intermediate their ends to ground, input means including a jack, and an amplifier connecting said jack to said coupling capacitors, output means including a jack and a coupling capacitor connecting said jack to said first named means, and means for producing modulating voltages of tremolo frequency, equal amplitude and of opposite phase upon each said circuit intermediate the ends thereof for cyclically varying the conductivity of said first named means.

2. A tremolo frequency modulator as defined in claim 1, said last named means including a control means for adjustably varying the frequency of the modulating voltages.

3. A tremolo frequency modulator as defined in claim 2 said last named means including a control means for adjustably varying the amplitude of the modulating voltages.

4. A low frequency modulator unit comprising, pair of parallel circuits each having coupling capacitors at one end and a rectifying device at the other end, said rectifying device arranged to render said circuits conductive in directions opposite to each other and being capable in response to voltages applied thereto to vary the conductivity thereof, resistance means of equal value connecting said circuits intermediate their ends to ground, input means include a jack and an amplifier connecting said jack to said coupling capacitors, output means including a jack and a coupling capacitor connecting said jack to said rectifying devices, means for producing a pair of square wave voltages of equal amplitude and opposite phase and means for coupling said last named means to said circuits intermediate the ends thereof for cyclically blocking said rectifying means.

References Cited in the file of this patent

UNITED STATES PATENTS 2,485,538 Rowe ---------------- Oct. 18, 1949
2,732,527 Emanuelsson ------------ Jan. 24, 1956

OTHER REFERENCES

Radio-Electronic Engineering, page 11, September 1953.